United States Patent
Araki (10) Patent No.: US 8,241,800 B2
(45) Date of Patent: Aug. 14, 2012

(54) FUEL CELL SYSTEM AND FUEL CELL CONTROL METHOD

(75) Inventor: Yasushi Araki, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 725 days.

(21) Appl. No.: 12/149,343

(22) Filed: Apr. 30, 2008

(65) Prior Publication Data

US 2008/0311451 A1 Dec. 18, 2008

Related U.S. Application Data

(60) Provisional application No. 61/064,049, filed on Feb. 13, 2008.

(51) Int. Cl.
*H01M 8/06* (2006.01)
*H01M 8/04* (2006.01)

(52) U.S. Cl. ......... 429/413; 429/428; 429/443; 429/450

(58) Field of Classification Search ........... 429/400–535
See application file for complete search history.

(56) References Cited

U.S. PATENT DOCUMENTS

| | | | | |
|---|---|---|---|---|
| 6,126,311 | A * | 10/2000 | Schuh | 374/21 |
| 6,376,111 | B1 * | 4/2002 | Mathias et al. | 429/413 |
| 7,687,164 | B2 * | 3/2010 | Frost et al. | 429/413 |
| 2003/0022044 | A1 * | 1/2003 | Inai et al. | 429/23 |

FOREIGN PATENT DOCUMENTS

JP 2002-175821 6/2002

* cited by examiner

*Primary Examiner* — Basia Ridley
*Assistant Examiner* — James Lee
(74) *Attorney, Agent, or Firm* — Finnegan, Henderson, Farabow, Garrett & Dunner, LLP (57) ABSTRACT

A fuel cell system includes: a polymer electrolyte fuel cell; a resistance sensor that detects the internal resistance of the fuel cell; a dew point sensor that detects the dew point of anode off gas from the fuel cell; and a controller that executes an electrolyte membrane hydration control according to the relationship between the internal resistance and the dew point. According to this configuration, it is possible to define, based on the relationship between the internal resistance and the dew point, the conditions under which the decreased power generation performance of the cell may be quickly recovered.

13 Claims, 9 Drawing Sheets

STATE A

FIG. 3B

STATE B

FIG. 3C

STATE C

FUEL CELL SYSTEM AND FUEL CELL CONTROL METHOD

INCORPORATION BY REFERENCE

This application is based on and claims the benefit of U.S. Provisional Application No. 61/064,049, filed Feb. 13, 2008. This application is also based on Japanese Patent Application No. 2007-008776 filed on Jan. 18, 2007. The specification, drawings, and abstract of both of these applications are incorporated herein by reference in their entirety.

BACKGROUND OF THE INVENTION

1. Field of the Invention

The present invention relates to a fuel cell system and a fuel cell control method.

2. Description of the Related Art

A fuel cell is a device that generates electric energy using, in general, hydrogen and oxygen as fuel. Because the fuel cell has a minimal effect on the environment and a high energy efficiency, it has been widely developed as a highly desirable energy supply system.

In the fuel cell, an electrolyte layer made of a solid polymer is interposed between an anode and a cathode to form a membrane electrode assembly (MEA), and the MEA is held between separators.

In the fuel cell, a hydrogen-containing gas is supplied to the anode and the hydrogen is dissociated over a catalyst into protons and electrons. The protons move toward the cathode through the electrolyte layer. The electrons produced by the dissociation of the hydrogen are taken out to an external circuit to be utilized as DC electric energy. Oxidant gas that contains oxygen is supplied to the cathode. At the cathode, the protons, the electrons, and the oxygen react to generate water.

If the amount of water contained in the solid polymer electrolyte is reduced, the ion conductivity of the solid polymer electrolyte decreases. Thus, it is necessary to maintain the water content of the solid polymer electrolyte at a predetermined level in order to continue power generation. In view of the above, Japanese Patent Application Publication No. 2002-175821 (JP-A-2002-175821) describes a process of controlling the back pressure of oxidant gas according to the internal resistance of the fuel cell, the relative humidity of off gas, etc., to maintain the water content of the electrolyte membrane at a predetermined level.

In order to improve the power generation efficiency of the fuel cell, it is preferable not to hydrate the electrolyte membrane as long as the power generation performance of the cell may be quickly recovered. However, the technique described in JP-A-2002-175821 does not take into account the conditions under which the power generation performance may be quickly recovered.

SUMMARY OF THE INVENTION

The present invention provides a fuel cell system and a fuel cell control method that refrains from hydrating the electrolyte membrane of a fuel cell as long as conditions allow the power generation performance of the cell to be quickly recovered.

A fuel cell system in accordance with an aspect of the present invention includes: a polymer electrolyte fuel cell; a resistance sensor that detects the internal resistance of the fuel cell; a dew point sensor that detects the dew point of anode off gas from the fuel cell; and a controller that executes an electrolyte membrane hydration control to hydrate the electrolyte membrane of the fuel cell according to relationship between the detected internal resistance and the dew point. According to the fuel cell system in accordance with this aspect, it is possible to define, based on the relationship between the detected internal resistance and the dew point, conditions under which the decreased power generation performance of the fuel cell may be quickly recovered. Thus, it is possible to refrain from executing the electrolyte membrane hydration control as long as conditions allow the power generation performance of the fuel cell to be quickly recovered. As a result, the power generation efficiency of the fuel cell is improved.

In the above aspect, the controller may execute the electrolyte membrane hydration control if a dew point variation per resistance variation ratio changes a smaller value upon crossing a boundary defined by a predetermined cell resistance. The dew point variation per resistance variation ratio is the variation amount in the dew point divided by a variation amount in the internal resistance and multiplied by negative one. In this case, it is possible to prevent the no-power generation region of the electrolyte membrane from increasing.

The controller executes the electrolyte membrane hydration control if the dew point variation per resistance variation ratio changes a smaller value upon crossing a boundary defined by a predetermined cell resistance and the internal resistance exceeds a predetermined value. In this case, temporary decreases in the dew point variation per resistance variation ratio are ignored. That is, the state of the fuel cell may be detected with improved accuracy.

The controller may alternatively execute the electrolyte membrane hydration control if the dew point variation per resistance variation ratio falls below a threshold value. In this case, it is possible to minimize dehydration of the electrolyte membrane of the fuel cell.

The controller executes the electrolyte membrane hydration control if the dew point variation per resistance variation ratio falls below the threshold value and the internal resistance falls within a predetermined range. In this case, temporary reductions of the dew point variation per resistance variation ratio are ignored. That is, the state of the fuel cell may be more accurately detected.

The controller may increase a relative humidity of the oxidant gas that is supplied to the fuel cell to execute the electrolyte membrane hydration control. In this case, the water content of the fuel cell can be increased.

A fuel cell control method in accordance with another aspect of the present invention includes: detecting an internal resistance of the fuel cell; detecting a dew point of anode off gas from the fuel cell; and executing an electrolyte membrane hydration control according to relationship between the detected internal resistance and the detected dew point.

According to this aspect, it is possible to refrain from hydrating the cell as long as conditions allow the power generation performance of the cell to be quickly recovered. Consequently, the power generation efficiency of the fuel cell is improved.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
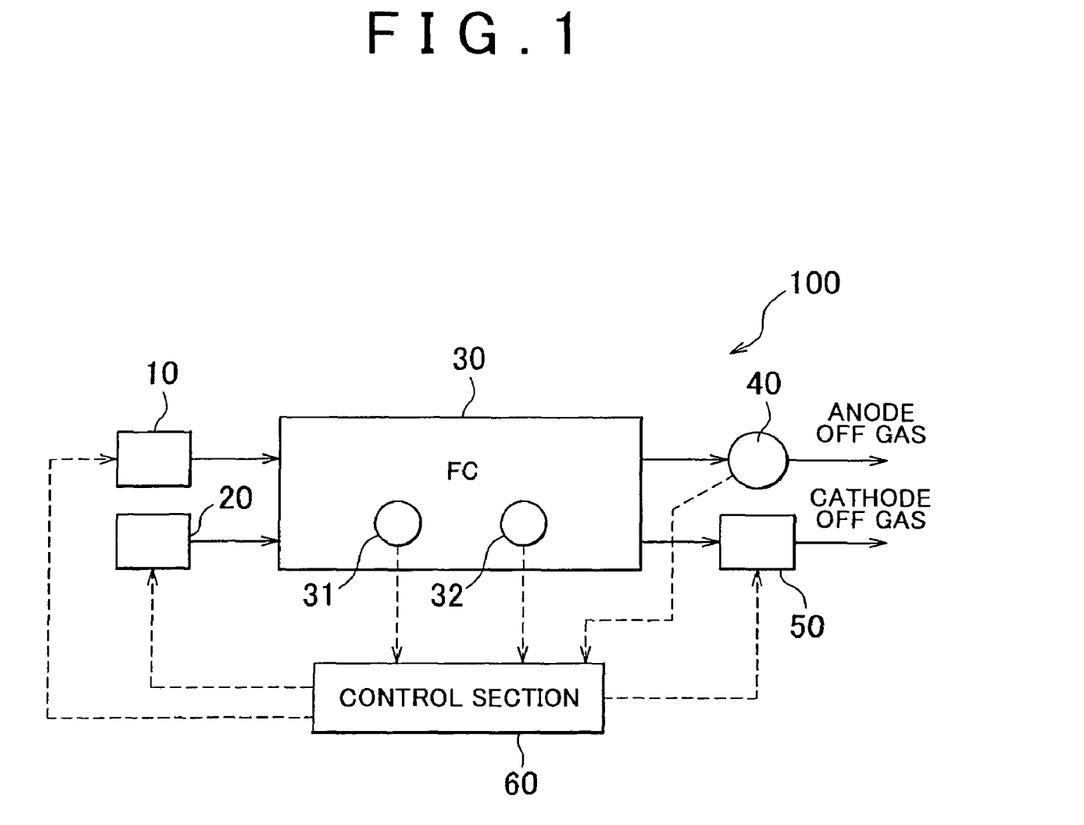
FIG. 1 is a schematic diagram showing the overall configuration of a fuel cell system in accordance with an embodiment of the present invention.
Figure 2:
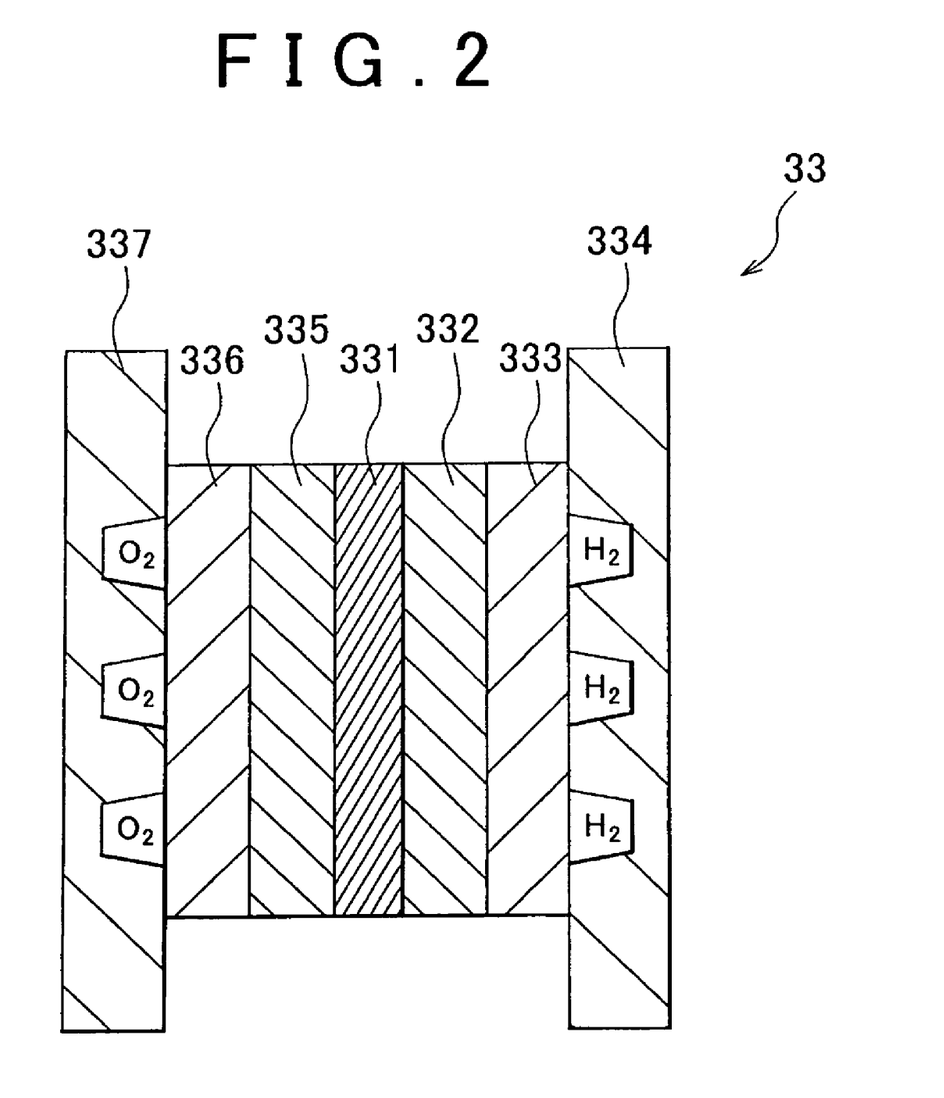
FIG. 2 is a schematic cross sectional view of the cell.

A fuel cell system 100 in accordance with an embodiment of the present invention is described with reference to FIGS. 1 and 2. FIG. 1 is a schematic diagram showing the overall configuration of the fuel cell system 100. FIG. 2 is a schematic cross sectional view of a cell 33. As shown in FIG. 1, the fuel cell system 100 includes fuel gas supply means 10, oxidant gas supply means 20, a fuel cell 30, a temperature sensor 31, a resistance sensor 32, a dew point sensor 40, a pressure regulation valve 50, and a control section 60.

The fuel gas supply means 10 supplies fuel gas containing hydrogen to the fuel cell 30. The fuel gas supply means 10 supplies the fuel cell 30 with fuel gas in accordance with instructions from the control section 60. The oxidant gas supply means 20 supplies oxidant gas containing oxygen to the fuel cell 30. The oxidant gas supply means 20 supplies the fuel cell 30 with oxidant gas in accordance with instructions from the control section 60.

The temperature sensor 31 detects the temperature of the fuel cell 30 and sends the detected temperature to the control section 60. The resistance sensor 32 detects the internal resistance of the fuel cell 30 and sends the detected internal resistance to the control section 60. The dew point sensor 40 detects the dew point of anode off gas, or the fuel gas after being subjected to power generation reaction in the fuel cell 30, to send the detected dew point to the control section 60. The pressure regulation valve 50 adjusts the back pressure of the oxidant gas in the fuel cell 30 in accordance with instructions from the control section 60.

The control section 60 is composed of a central processing unit (CPU), a read only memory (ROM), a random access memory (RAM), and so on. The control section 60 controls the fuel cell system 100 based on the detection results sent from the temperature sensor 31, the resistance sensor 32, and the dew point sensor 40.

Now, the fuel cell 30 will be described in detail. The fuel cell 30 has a stack structure in which a plurality of cells 33 are stacked. In this embodiment, the cell 33 is a polymer electrolyte fuel cell. In the cell 33, as shown in FIG. 2, an anode catalyst layer 332, a gas diffusion layer 333, and a separator 334 are laminated in the stated order on one surface of an electrolyte membrane 331 made of a solid polymer having proton conductivity, and a cathode catalyst layer 335, a gas diffusion layer 336, and a separator 337 are laminated in the stated order on the opposite surface of the electrolyte membrane 331.

The electrolyte membrane 331 may be made of, for example, a perfluorosulfonic acid polymer. The anode catalyst layer 332 promotes the conversion of the hydrogen into protons. The cathode catalyst layer 335 promotes the reaction between the protons and the oxygen. The anode catalyst layer 332 and the cathode catalyst layer 335 are made of, for example, platinum-carrying carbon. The gas diffusion layer 333 is permeable to the fuel gas containing hydrogen. The gas diffusion layer 336 is permeable to the oxidant gas containing oxygen. The gas diffusion layers 333 and 336 may be made of, for example, carbon paper. The separator 334 is formed with a fuel gas flow path. The separator 337 is formed with an oxidant gas flow path. The fuel gas is supplied from the fuel gas supply means 10 to the fuel gas flow path of the separator 334. The fuel gas permeates the gas diffusion layer 333 to reach the anode catalyst layer 332. The hydrogen contained in the fuel gas is dissociated over a catalyst of the anode catalyst layer 332 into protons and electrons. The protons are conducted through the electrolyte membrane 331 to reach the cathode catalyst layer 335.

Meanwhile, the oxidant gas is supplied from the oxidant gas supply means 20 shown in FIG. 1 to the oxidant gas flow path of the separator 337. The oxidant gas permeates the gas diffusion layer 336 to reach the cathode catalyst layer 335. In the cathode catalyst layer 335, the protons and the oxygen react with each other over a catalyst. This generates electricity and forms water. A part of the formed water is retained in the electrolyte membrane 331. The rest of the formed water is drained from the oxidant gas flow path and the fuel gas flow path.

When the operating temperature of the fuel cell 30 is relatively low, the water content of the electrolyte membrane 331 is maintained at a predetermined level. As the operating temperature of the fuel cell 30 increases, however, the interior of the fuel cell 30 becomes drier. This may occasionally cause the water content of the electrolyte membrane 331 to fall below the predetermined level. Accordingly, the power generation performance of the electrolyte membrane 331 is reduced in the areas where the water content of the electrolyte membrane 331 has decreased. Below, the process by which the water content of the electrolyte membrane 331 is reduced will be described with reference to FIGS. 3A to 3C.

Figure 3A:
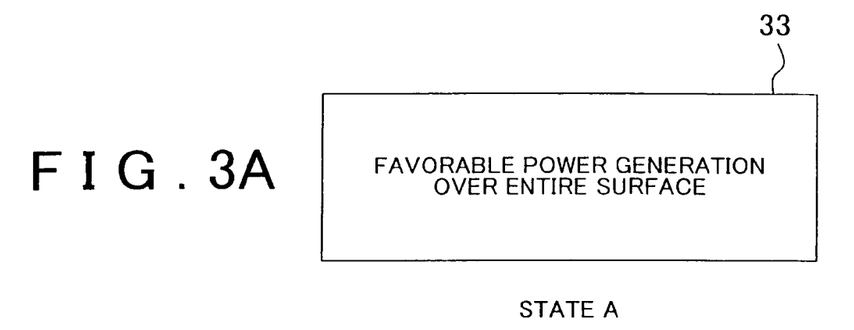
FIG. 3 illustrates how the water content of the electrolyte membrane is reduced.

FIGS. 3A to 3C are each a schematic plan view of the cell 33. When the water content of the electrolyte membrane 331 is maintained at a predetermined level due to the water contained in the reaction gas supplied to the cell 33 and the water formed in the cell 33, the entire surface of the electrolyte membrane 331 may be used to generate electricity as shown in FIG. 3A. The state shown in FIG. 3A is hereinafter referred to as "state A."

Figure 3B:
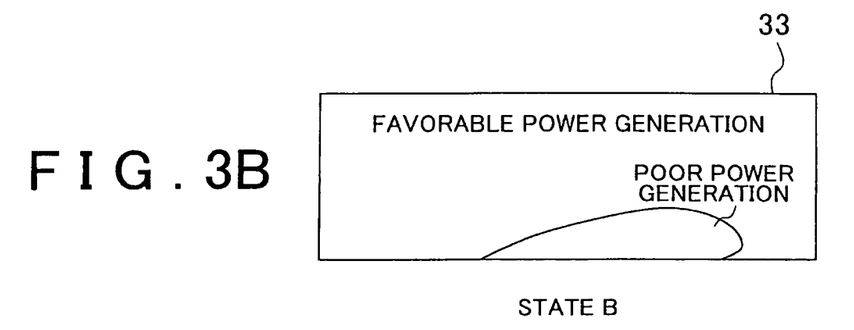
Figure 3C:
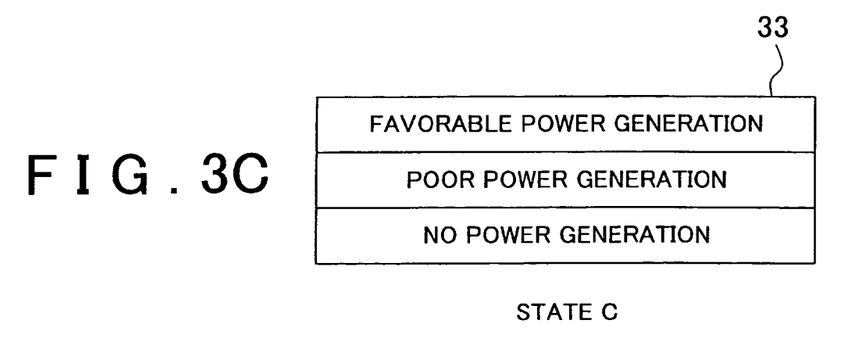

If the water is removed from the electrolyte membrane 331 due to high-temperature operation of the cell 33, etc., however, the water content of the electrolyte membrane 331 is partially reduced. In this case, the effective power generation area of the cell 33 is reduced. Accordingly, the power generation performance of the cell 33 decreases. For example, the water content tends to be reduced in the vicinity of the entrance where the oxidant gas is supplied. The state shown in FIG. 3B is hereinafter referred to as "state B." If the cell 33 is further dried, there appears a no-power generation region where no or almost no power is generated as shown in FIG. 3C. The state shown in FIG. 3C is hereinafter referred to as "state C."

Figure 4:
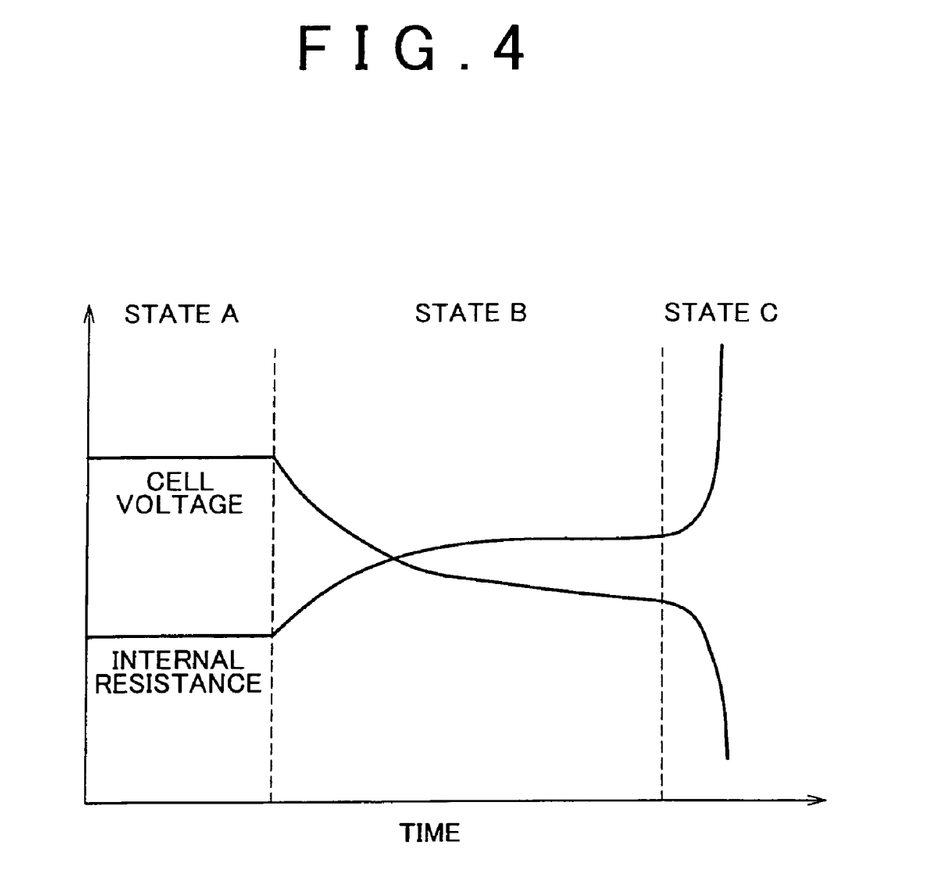
FIG. 4 is a chart illustrating the cell voltage and the internal resistance in the states A to C.

Next, the cell voltage and the internal resistance in the states A to C will be described with reference to FIG. 4. In FIG. 4, the vertical axis represents the cell voltage and the internal resistance, and the horizontal axis represents time. As shown in FIG. 4, the cell voltage and the internal resistance are maintained to be generally constant in the state A. If the electrolyte membrane 331 is partially dried, thereby shifting the cell 33 to the state B, however, the internal resistance of the cell increases. This is because the water content of the electrolyte membrane 331 has decreased. In this case, the cell voltage is reduced. If a process to hydrate the electrolyte membrane 331 is executed in the state B, the electrolyte membrane 331 returns to the state A relatively quickly. If the electrolyte membrane 331 is further dried and the cell 33 shifts to the state C, the no-power generation region is rapidly enlarged. Along with the enlargement of the no-power generation region, the internal resistance of the fuel cell rapidly increases and the cell voltage quickly drops. In this case, the amount of water generated by the fuel cell reaction decreases in the no-power generation region, and therefore it takes a longer time for the water content of the electrolyte membrane 331 to recover to the predetermined level.

Figure 5A:
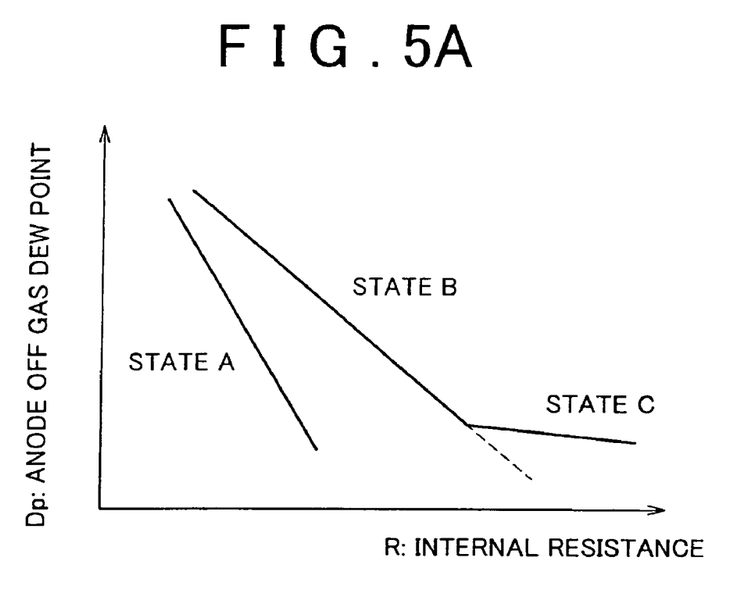
FIG. 5 shows the relationship between the dew point of anode off gas and the internal resistance in the states A to C.
Figure 5B:
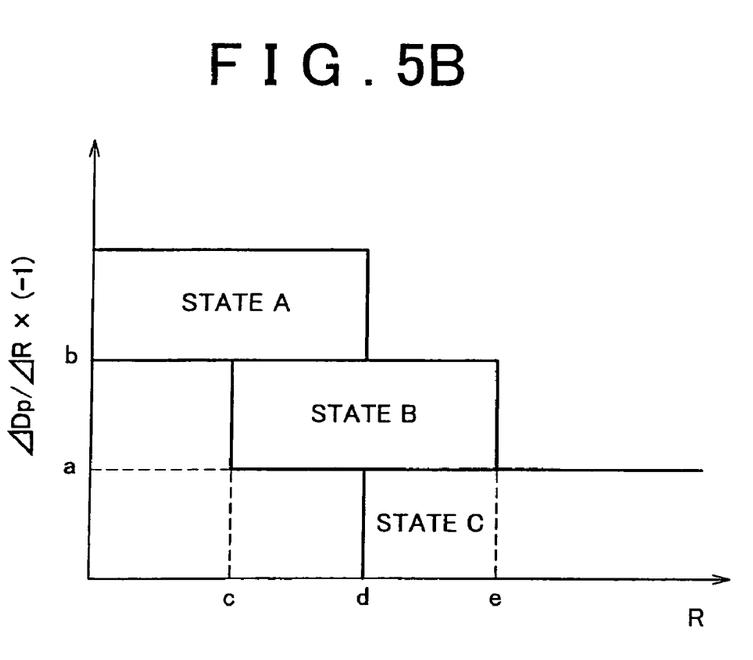

In this embodiment, the state of the cell 33 is detected using the relationship between the dew point of the anode off gas and the internal resistance. This is made possible by a correlation between the water content of the electrolyte membrane 331 and the dew point of the anode off gas. FIG. 5 shows the relationship between the dew point of the anode off gas and the internal resistance in the states A to C. In FIG. 5A, the vertical axis represents the dew point Dp of the anode off gas, and the horizontal axis represents the internal resistance R. The vertical axis of FIG. 5B represents a value obtained by dividing the unit variation amount ΔDp in the dew point of the anode off gas by the unit variation amount AR in the internal resistance and multiplying the product by negative one (the value is hereinafter referred to as "dew point variation per resistance variation ratio"). That is, the vertical axis of FIG. 5B represents the absolute value of the slope of the lines representing the correlation between the dew point Dp and the internal resistance R in FIG. 5A. The horizontal axis of FIG. 5B represents the internal resistance R.

As shown in FIG. 5A, the dew point variation per resistance variation ratio in the state A generally remains constant even when the fuel cell 30 has been generating power continuously for a long time. The internal resistance remains below a certain fixed value. This is because the water content of the electrolyte membrane 331 is maintained at a predetermined level due to the water present in the reaction gas supplied to the cell 33 and the water generated in the cell 33.

Meanwhile, the dew point variation per resistance variation ratio in the state B is smaller than that in the state A. This is because the internal resistance increases as the effective power generation area reduces in the state B. If the effective power generation area is significantly reduced in the state B and the internal resistance increases even further, the cell 33 shifts to state C. In this case, the dew point variation per resistance variation ratio changes to a value that is even smaller than that in state B.

From the above can be derived the relationship shown in FIG. 5B. If the dew point variation per resistance variation ratio is exceeds than a threshold ratio (the value (b) in FIG. 5B), it is determined that the electrolyte membrane 331 remains in state A. That is, the cell 33 continues to generate power generally over the entire surface of the electrolyte membrane 331. A value that exceeds the value b is referred to as "theoretical value of dew point variation per resistance variation ratio."

If the dew point variation per resistance variation ratio falls within a predetermined range (between the value (a) and the value (b) in FIG. 5B) and the internal resistance is in a predetermined range (between the value (c) and the value (e) in FIG. 5B), it is determined that the electrolyte membrane 331 remains in state B. If the dew point variation per resistance variation ratio is below a threshold ratio (the value (a) in FIG. 5B), it is determined that the electrolyte membrane 331 is in state C. As described above, it is possible to detect which of states A to C the electrolyte membrane 331 is in by detecting the relationship between the dew point of the anode off gas and the internal resistance. The values (a) to (e) in FIG. 5B are determined according to various design specifications of the fuel cell 30, the operating conditions of the fuel cell 30, and so on.

In this embodiment, the control section 60 controls the pressure regulation valve 50 to increase the backpressure of the oxidant gas in the fuel cell 30 if it is determined that the electrolyte membrane 331 is in state C. The control maintains the cell 33 in state B. In this case, it is possible to refrain from hydrating the electrolyte membrane 331 as long as conditions allow the power generation performance of the fuel cell 30 to be quickly recovered. As a result, it is possible to avoid decreasing the power generation efficiency of the fuel cell 30.

Figure 6:
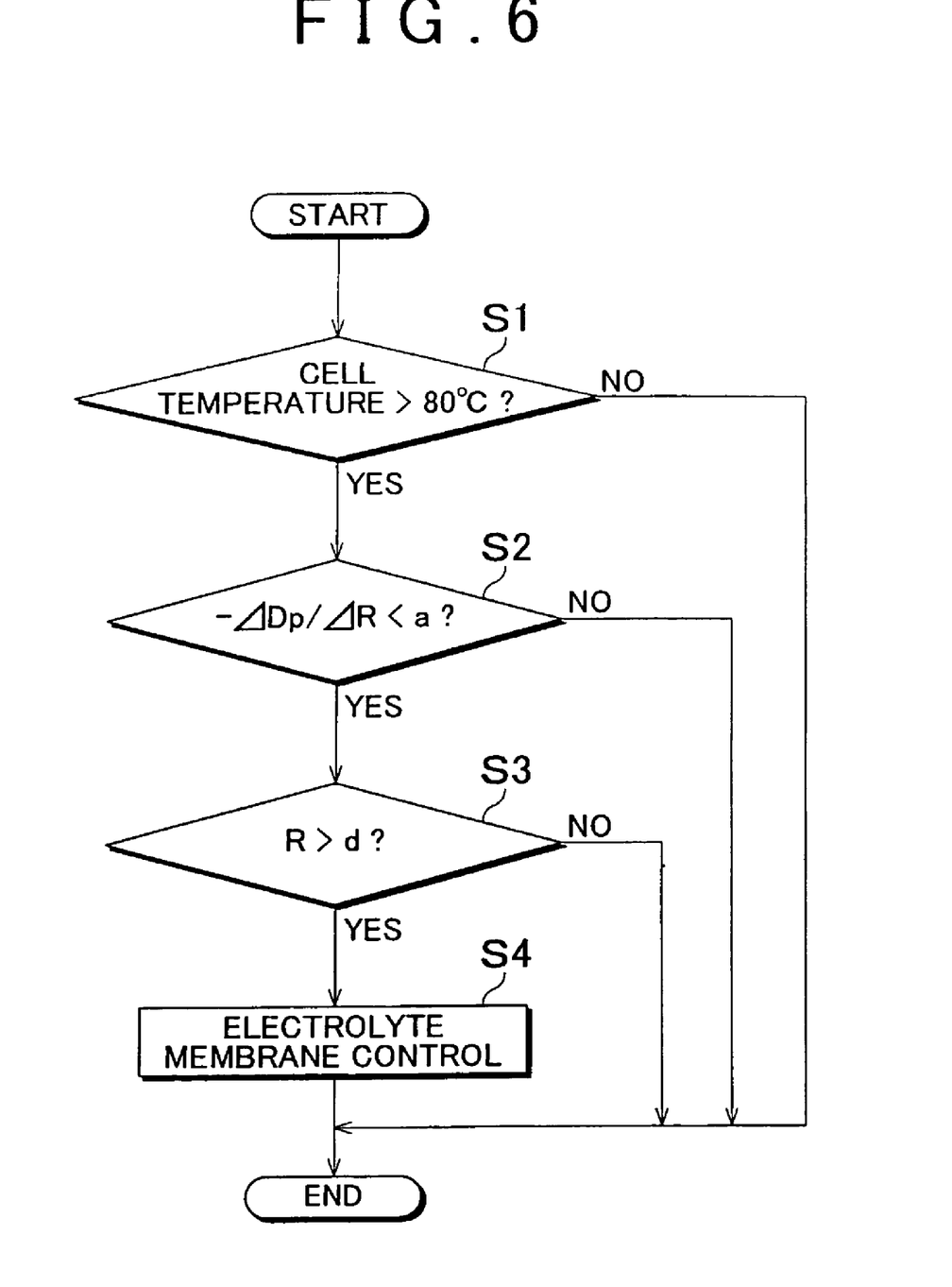
FIG. 6 shows an example flowchart.

FIG. 6 is a flowchart showing the control executed before the pressure regulation valve 50 increases the backpressure of the oxidant gas. As shown in FIG. 6, the control section 60 first acquires the cell temperature from the temperature sensor 31 to determine whether the cell temperature exceeds a prescribed temperature. In the following description, the prescribed temperature is set to, for example, 80° C. (step S1). If it is determined that the cell temperature exceeds 80° C. in step S1, the control section 60 determines whether the dew point variation per resistance variation ratio is below a threshold ratio (step S2). In this case, the control section 60 determines whether the electrolyte membrane 331 has shifted from state B to state C. The control section 60 uses the value (a) in FIG. 5B as the threshold ratio in step S2.

If it is determined that the dew point variation per resistance variation ratio is determined to be below the threshold ratio in step S2, the control section 60 determines whether the internal resistance R exceeds a threshold resistance (step S3). In this case, temporary reductions of the dew point variation per resistance variation ratio are ignored. That is, the state of the electrolyte membrane 331 may be detected with improved accuracy. This eliminates unnecessary control. The control section 60 uses the value (d) in FIG. 5B as the threshold resistance in step S3.

If it is determined that the internal resistance R exceeds the threshold resistance in step S3, the control section 60 controls the pressure regulation valve 50 to increase the backpressure of the oxidant gas in the fuel cell 30 (step S4). This prevents enlargement of the no-power generation region of the electrolyte membrane 331. After that, the control section 60 ends the operation.

If it is determined that the cell temperature does not exceed 80° C. in step S1, the dew point variation per resistance variation ratio is not to below the threshold ratio in step S2, or the internal resistance R does not exceed the threshold resistance in step S3, the control section 60 ends the operation. Thus, unnecessary control can be eliminated.

In step S2, instead of determining whether the dew point variation per resistance variation ratio is below the value (a), it may alternatively be determined whether the dew point variation per resistance variation ratio has fallen from a threshold ratio. This allows determining whether the cell 33 has shifted from state B to state C. Also in step S2, a value larger than the value (a) may alternatively be used. In this case, the water content of the electrolyte membrane 331 may be increased before a no-power generation region is formed on the electrolyte membrane 331.

Figure 7:
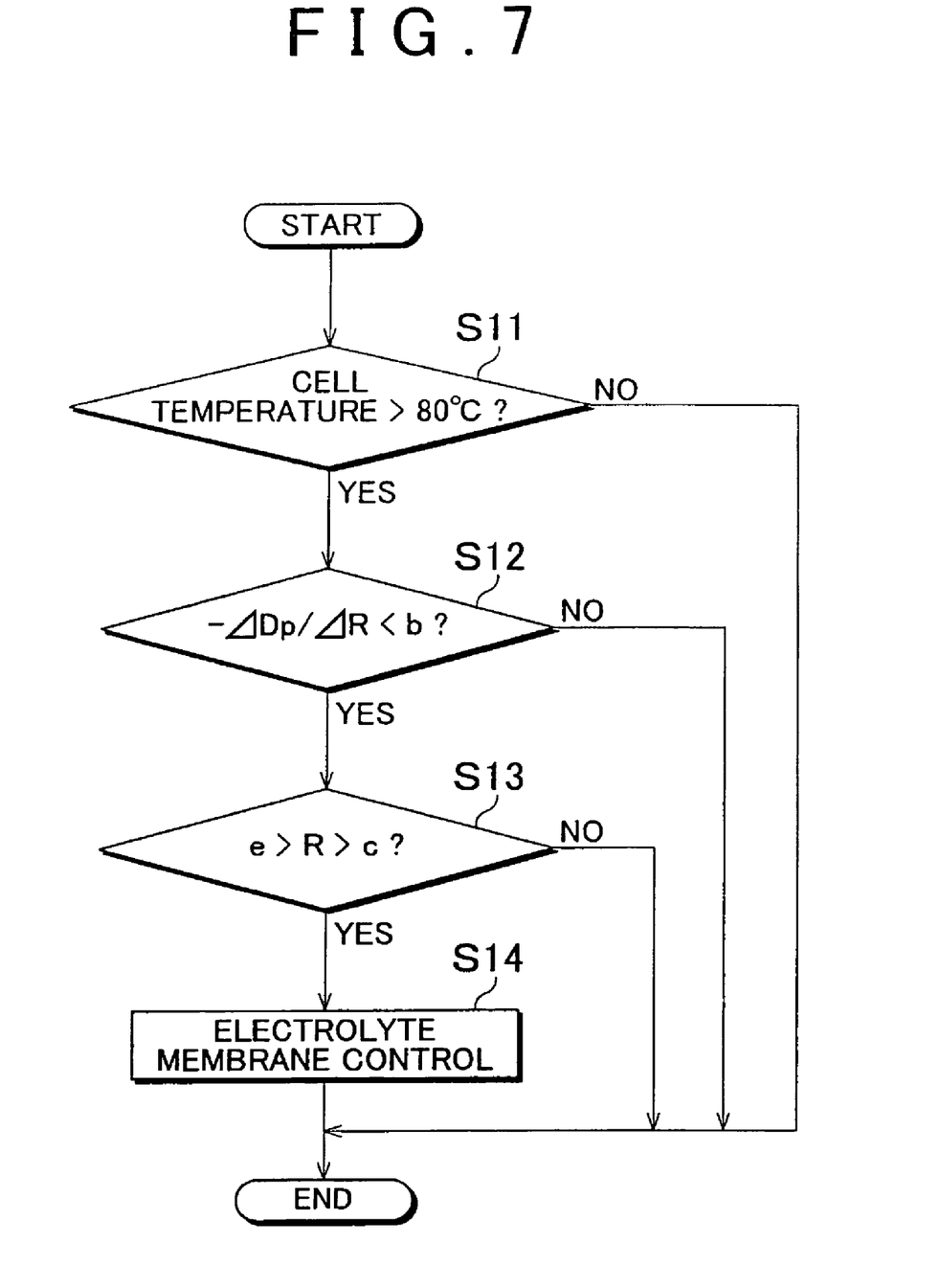
FIG. 7 shows another example flowchart.

Alternatively, the control section 60 may control the pressure regulation valve 50 to increase the backpressure of the oxidant gas in the fuel cell 30 when the electrolyte membrane 331 has shifted to state B. In this case, it is possible to prevent the appearance of a no-power generation region in the fuel cell 30. FIG. 7 shows a flowchart for such a case.

As shown in FIG. 7, the control section 60 first acquires the fuel cell temperature from the temperature sensor 31 to determine whether the fuel cell temperature exceeds 80° C. (step S11). If it is determined that the cell temperature exceeds 80° C. in step S11, the control section 60 determines whether the dew point variation per resistance variation ratio is smaller than a threshold ratio (step S12). In this case, the control section 60 determines whether the electrolyte membrane 331 is in state B. The control section 60 may use a value in the range between the value (b) and the value (a) in FIG. 5B as the threshold ratio in step S12.

If it is determined that the dew point variation per resistance variation ratio is below the threshold ratio in step S12, the control section 60 determines whether the internal resistance R falls within a predetermined range (step S13). In this case, temporary reductions of the dew point variation per resistance variation ratio are ignored. That is, the state of the electrolyte membrane 331 may be detected with improved accuracy. The control section 60 may use the range between the value (c) and the value (e) in FIG. 5B as the predetermined range in step S13.

If it is determined that the internal resistance R falls within the predetermined range in step S13, the control section 60 controls the pressure regulation valve 50 to increase the backpressure of the oxidant gas in the fuel cell 30 (step S14). This reduces the dehydration of the electrolyte membrane 331. After that, the control section 60 ends the operation.

If it is determined that the cell temperature does not exceed 80° C. in step S11, the dew point variation per resistance variation ratio is not to be smaller than the threshold ratio in step S12, and the internal resistance does not exceed the threshold resistance in step S13, the control section 60 ends the operation. Thus, unnecessary control may be eliminated.

Although decreases in the water content of the electrolyte membrane 331 may be minimized by increasing the backpressure of the oxidant gas in this embodiment, such decreases in the water content of the electrolyte membrane 331 may be minimized in other ways as well. For example, the water to be supplied to fuel cell 30 may be added to the reaction gas via a spray or the like, or the flow rate of the reaction gas may be increased in addition to adding water to the reaction gas. It should be noted that the water content of the electrolyte membrane 331 is preferably recovered in a short time when recovering the cell 33 from the state C to the state B. This is because the no-power generation region tends to rapidly enlarge once the cell 33 enters the state C. Thus, in this case, it is preferable to increase the backpressure of the oxidant gas. Increasing the back pressure of the oxidant gas reduces the time taken for the relative humidity of the oxidant gas to increase.

In the above embodiment, the no-power generation state may refer to not only a state where power is not generated but also a state inferior to a poor power generation state, and may include, for example, a state where slight power can be generated.

The relationship between the dew point of the anode off gas and the internal resistance is measured using the fuel cell system 100 in accordance with the above embodiment as described below. Specifically, the dew point variation per resistance variation ratio was measured while varying the dew point of the reaction gas that is supplied to the fuel cell 30. In the fuel cell 30, a fluorinated electrolyte membrane having a thickness of 20 μm is used as the electrolyte membrane 331, platinum-carrying carbon is used as the anode catalyst layer 332 and the cathode catalyst layer 335, and carbon paper is used as the gas diffusion layers 333 and 336. The operation is performed without hydrating the cathode, simulating the conditions at a temperature of 80° C. In addition, the current density was 1.6 A/cm$^2$ and the back pressure at both electrodes was 40 kPaG. The operation is performed for two hours in Example 1, and for one hour in Examples 2 and 3.

In Example 1, the dew point variation per resistance variation ratio was measured while the dew point of the reaction gas was lowered from 80° C. to 45° C.

In Example 2, the dew point variation per resistance variation ratio was measured while the dew point of the reaction gas was lowered from 80° C. to 35° C. That is, a smaller amount of moisture was added to the reaction gas in Example 2 than in Example 1.

In Example 3, the dew point variation per resistance variation ratio was measured while the dew point of the reaction gas was lowered from 80° C. to 25° C. That is, a smaller amount of moisture was added to the reaction gas in Example 3 than in Examples 1 and 2.

Figure 8:
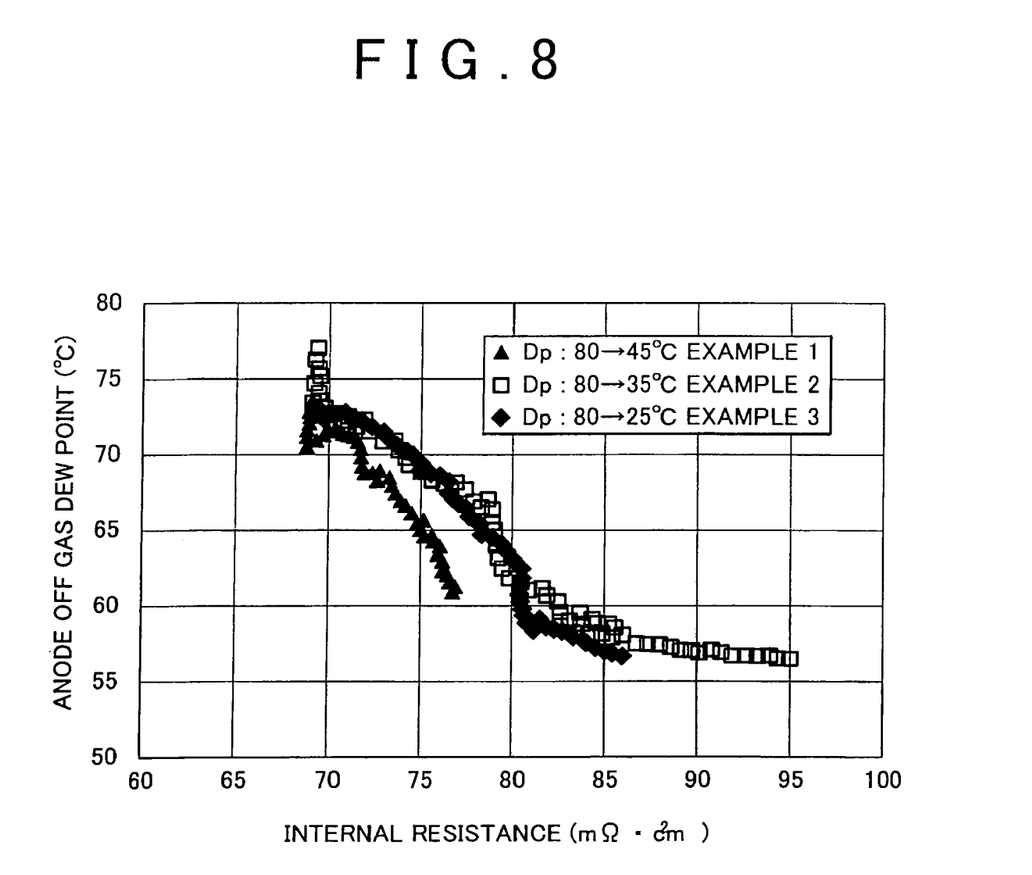
FIG. 8 is a chart showing the results of measuring the dew point variation per resistance variation ratio.

FIG. 8 shows the results of measuring the dew point variation per resistance variation ratio. In FIG. 8, the vertical axis represents the dew point of the anode off gas, and the horizontal axis represents the internal resistance of the fuel cell. As shown in FIG. 8, in Example 1, the dew point variation per resistance variation ratio generally remains constant even while the fuel cell 30 generates power continuously for a long time. The internal resistance remains below a certain fixed value. That is, the dew point variation per resistance variation ratio may be maintained at a theoretical value if the water content of the electrolyte membrane 331 is maintained at a predetermined level.

In Examples 2 and 3, the dew point variation per resistance variation ratio generally remains constant until the internal resistance reaches a threshold resistance. In this case, the dew point variation per resistance variation ratio was below that in Example 1. After the internal resistance exceeds the threshold resistance, the dew point variation per resistance variation ratio further decreases. Thus, it was proved that the dew point variation per resistance variation ratio changes as the electrolyte membrane 331 is dehydrated. The above results demonstrate that the hydration of the electrolyte membrane 331 may be detected by monitoring the relationship between the dew point of the anode off gas and the internal resistance.

In Example 4, the dew point of the reaction gas was lowered after causing flooding once.

In Example 5, the dew point of the reaction gas was lowered without causing flooding.

Figure 9:
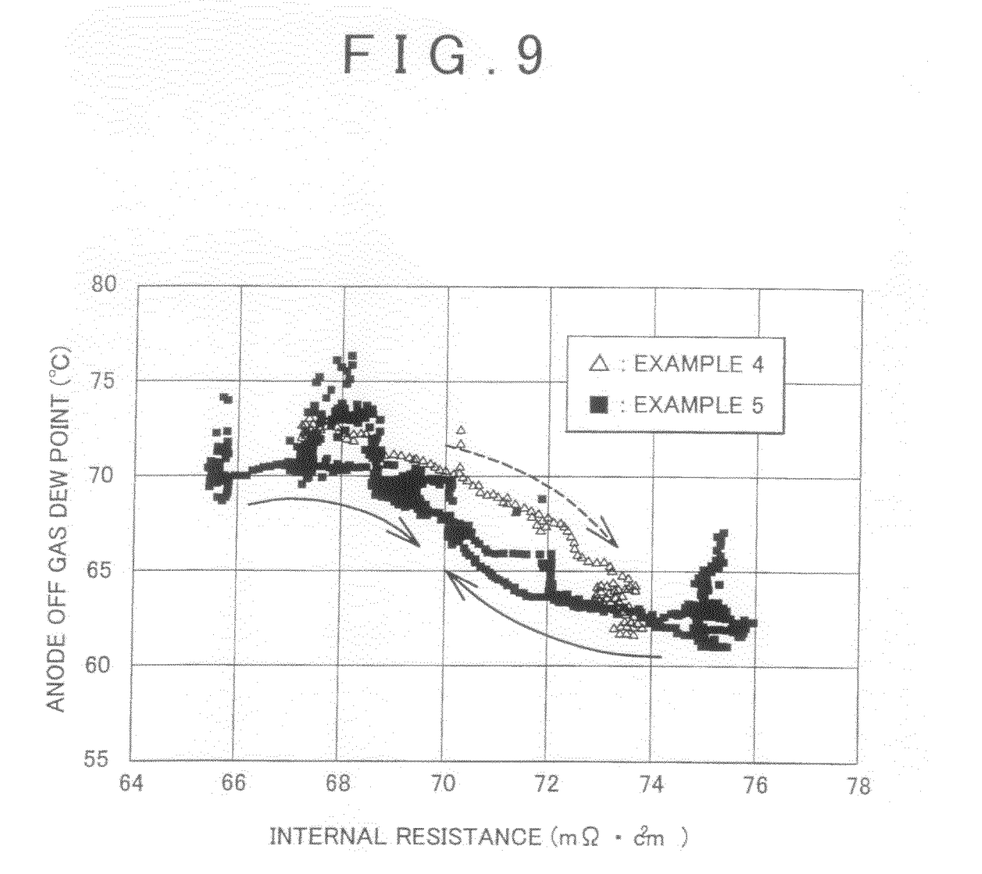
FIG. 9 is a chart showing the results of measuring the dew point variation per resistance variation ratio.

FIG. 9 shows the measurement results. In FIG. 9, the vertical axis represents the dew point of the anode off gas, and the horizontal axis represents the internal resistance. As shown in FIG. 9, for the same anode off gas dew point, the internal resistance was increased in Example 4 compared to that in Example 5. That is, the internal resistance was increased for the fuel cell 30 with a flooding history. However, the dew point variation per resistance variation ratio in Example 4 was generally the same as that in Example 5. Thus, it was confirmed that the hydration of the electrolyte membrane 331 may be detected by detecting the relationship between the dew point of the anode off gas and the internal resistance, regardless of whether flooding had previously occurred.

What is claimed is:
1. A fuel cell system comprising:
 a polymer electrolyte fuel cell;
 an anode off gas passage;
 a cathode off gas passage separate from the anode off gas passage;

a resistance sensor configured to detect an internal resistance of the fuel cell;

a dew point sensor associated with the anode off gas passage and configured to detect a dew point of anode off gas from the fuel cell; and a controller programmed to execute an electrolyte membrane hydration control according to a relationship between the detected internal resistance and the detected dew point, wherein the controller is programmed to execute the electrolyte membrane hydration control if a dew point variation per resistance variation ratio changes to a smaller value upon crossing a boundary defined by a predetermined cell resistance, wherein the dew point variation per resistance variation ratio is a variation amount in the detected dew point divided by a variation amount in the detected internal resistance and multiplied by −1.

2. The system according to claim 1, wherein the controller is configured to execute the electrolyte membrane hydration control if the dew point variation per resistance variation ratio changes to a smaller value upon crossing a boundary defined by the predetermined cell resistance and the internal resistance exceeds a predetermined value.

3. The system according to claim 1, wherein the controller is configured to execute the electrolyte membrane hydration control if a dew point variation per resistance variation ratio falls below a threshold value.

4. The system according to claim 3, wherein the controller is configured to execute the electrolyte membrane hydration control if the dew point variation per resistance variation ratio falls below the threshold value and the internal resistance falls within a predetermined range.

5. The system according to claim 1, wherein the controller is configured to execute the electrolyte membrane hydration control by increasing the relative humidity of oxidant gas that is supplied to the fuel cell.

6. The system according to claim 1, further comprising:
an on-off valve configured to adjust a back pressure of the oxidant gas in the fuel cell,
wherein the controller is configured to execute the electrolyte membrane hydration control by controlling the on-off valve to increase the back pressure of the oxidant gas in the fuel cell.

7. The system according to claim 1, wherein:
the controller is configured to determine a power generation performance state of the fuel cell according to the detected internal resistance and the detected dew point;
the controller is configured such that when the power generation performance state determined by the controller indicates that the fuel cell has a first region having a first performance capability and a second region having a second performance capability, and when the second performance capability is inferior to the first performance capability, the controller is configured to execute the electrolyte membrane hydration control.

8. The system according to claim 7, wherein:
the controller is configured such that when the power generation performance state determined by the controller indicates that the second region is further divided into a third region having a third performance capability and a fourth region having a fourth performance capability, when the third performance capability is poor, and when the fourth performance capability is inferior to the third performance capability and substantially in a state where no power is generated, the controller is configured to execute the electrolyte membrane hydration control such that the fourth performance capability of the fourth region increases to be the same as the third performance capability or the first performance capability.

9. The system according to claim 7, wherein
the controller is configured such that when the power generation performance state determined by the controller indicates that the second region is further divided into a third region having a third performance capability and a fourth region having a fourth performance capability, when the third performance capability is poor, and when the fourth performance capability is inferior to the third performance capability and substantially in a state where no power is generated, the controller is configured to execute the electrolyte membrane hydration control such that the third performance capability of the third region and the fourth performance capability of the fourth region increase to be the same as the first performance capability.

10. A method for controlling a polymer electrolyte fuel cell, comprising:
detecting an internal resistance of the fuel cell;
detecting a dew point of anode off gas from the fuel cell in an anode off gas passage separate from a cathode off gas passage; and
executing an electrolyte membrane hydration control according to a relationship between the detected internal resistance and the detected dew point; and
determining whether a dew point variation per resistance variation ratio, which is a variation amount in the detected dew point divided by a variation amount in the detected internal resistance and multiplied by −1, falls below a threshold ratio, wherein
the electrolyte membrane hydration control is executed if the determining determines that the dew point variation per resistance variation ratio falls below the threshold ratio.

11. The method according to claim 10, wherein
the determining further comprises determining whether the internal resistance exceeds a predetermined value, wherein:
the electrolyte membrane hydration control is executed if it is determined the determining determines that the dew point variation per resistance variation ratio falls below the threshold ratio and the internal resistance exceeds the predetermined value.

12. The system according to claim 3, wherein the controller is configured to prohibit execution of the electrolyte membrane hydration control if the dew point variation per resistance variation ratio does not fall below the threshold ratio.

13. The method according to claim 10, wherein the electrolyte membrane hydration control is not executed if the determining determines that the dew point variation per resistance variation ratio does not fall below the threshold ratio.

* * * * *